Oct. 1, 1929.   J. H. SCHEER   1,730,166
STEERING WHEEL LOCK
Filed July 12, 1928   2 Sheets-Sheet 1
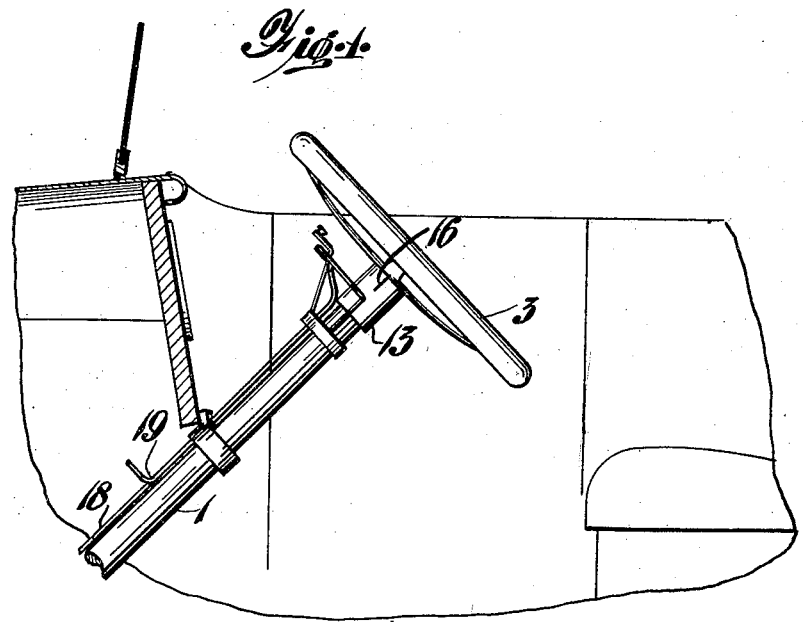
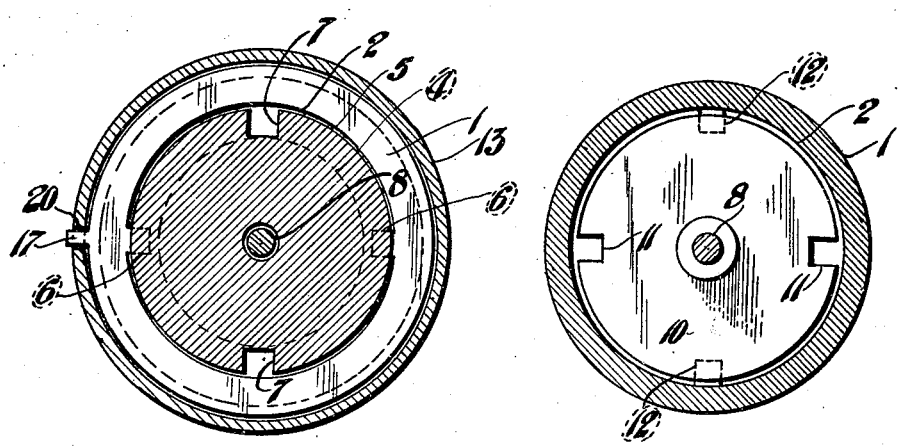
Inventor
John H. Scheer
By Adam E. Fisher
Attorney

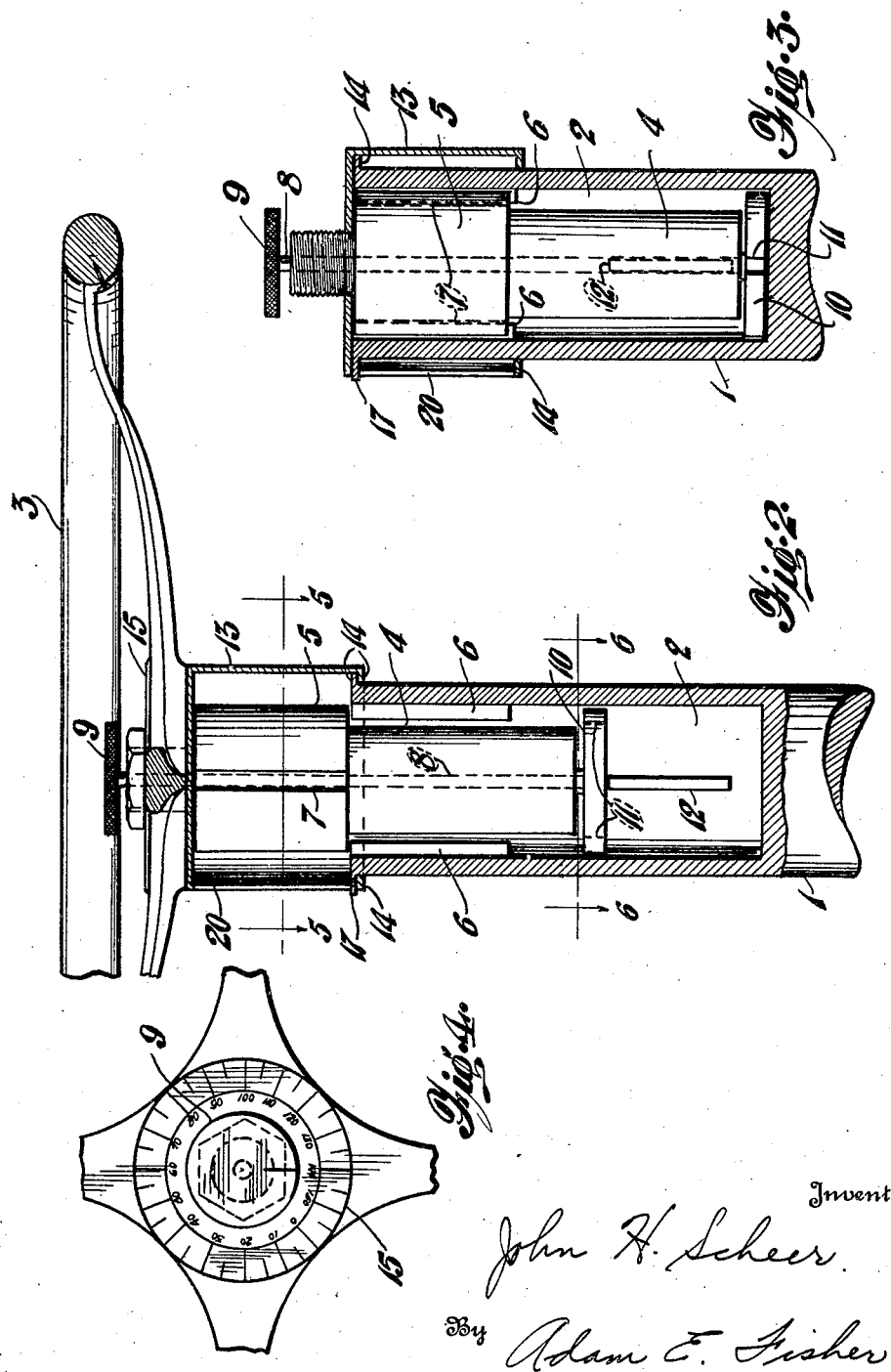

Patented Oct. 1, 1929

1,730,166

UNITED STATES PATENT OFFICE

JOHN H. SCHEER, OF TROY, MISSOURI

STEERING-WHEEL LOCK

Application filed July 12, 1928. Serial No. 292,108.

This invention relates to steering wheel locks for automobiles.

The main object of the invention is to provide a simple, practical and efficient means for throwing the steering wheel into or out of engagement with the steering post, the latter position being considered as a locked position, and the former as the operative position.

In the drawings

Figure 1 is an inside view in elevation of a portion of the tonneau of an automobile, showing the steering wheel and upper portion of the steering post, the instrument board being shown in section. In this view the spark and fuel rods which are usually extended through the steering column are shown as mounted along outside of the steering post, as necessary in the installation of the elements of my invention which are seated within the upper portion of the steering post.

Figure 2 is a longitudinal section through the upper portion of a steering post having my invention incorporated therein and shown in full lines, the steering wheel being shown as broken off at one side and in section at the other side. In this view, the elements of my invention are shown as in their inoperative or locked position.

Figure 3 is a longitudinal section through the upper portion of a steering post having my invention incorporated and shown in full lines, the elements of the invention being shown in their operative position.

Figure 4 is a fragmentary view in plan of the hub portion of a steering wheel and associated elements, my invention being incorporated in connection therewith.

Figure 5 is a transverse section on the line 5—5 of Figure 2.

Figure 6 is a transverse section on the line 6—6 of Figure 2.

Figure 7 is a detail of the lock cylinder.

In carrying out the invention, the steering post 1 is provided at its upper end with a longitudinal bore 2. The steering wheel 3 is rigidly mounted upon the upper end of a lock cylinder 4 which is enlarged at that upper end as shown at 5 and provided thereat with two lock-slots 7 cut longitudinally in the outer cylindrical face of the portion 5, spaced at diametrically opposite points thereon and extended in parallelism with the axis of the element 4. Two enlongated lock lugs 6 are permanetnly mounted at diametrically opposite points upon the inner periphery of the upper portion of the bore 2 in parallelism with the axis of the post 1. The cylinder 4 is adapted to slide within the bore 2 and the lugs 6 to slidably engage the slots 7. A small lock rod 8 is rotatably and slidably passed through the cylinder 4 and out through the hub of the wheel, and is provided at its upper end with an operating knob 9. At its lower end a locking disk 10 is rigidly mounted, the same having two lock slots 11 cut into its periphery at diametrically opposite points. These slots are adapted to slidably engage two elongated, diametrically opposed lock lugs 12 upon the inner peripheral face of the lower portion of the bore 2. The lugs 12 are extended in parallelism with the axis of the post 1, similarly with the lugs 6, but they are preferably arranged at points ninety degrees from the lugs 6 and with the lower ends of the lugs 6 spaced above the upper ends of the lugs 12 so as to provide room between the two sets of lugs for the reception and rotation of the disk 10. It will be noted that the rod 8 is of a length just to permit of the disk 10 clearing the upper and lower ends of the lugs 12 as the said rod is moved up and down with the steering wheel 3. A collar 13 protects the mechanism and shoulders 14 limit the upward sliding movement of the cylinder 4. A pin 17 upon the post 1 works in a slot 20 cut in the collar 13, and thus prevents the collar from rotating as the wheel 3 is turned. A graduated dial plate 15 is mounted rigidly upon the wheel 3. A permanent guide mark 16 is stamped upon the collar 13. The usual spark and throttle rods 18 and 19, which are ordinarily run down through the post 1, are for the purposes of installation of this invention, run down the outside of the post 1, as shown in the drawing.

In operation, when it is desired to "lock" the car, the wheel 3 is elevated to the limit of the collar 13, as shown in Figure 2, and in this position the disk 10 will be rotatably positioned betwen the lugs 6 and 12. The cylinder 4 will have a bearing upon and may be freely rotated upon the said disk 10, without turning the post 1. Thus the steering mechanism of the car is effectually safeguarded against unauthorized use. To throw the said mechanism into operative position, all that is necessary is to rotate the wheel 3 and knob 9 so that the slots 7 and 11 are aligned with the lugs 6 and 12 respectively, after which the cylinder 4 and disk 10 may be lowered, the cylinder 4 remaining in engagement with the lugs 6 while the disk 10 passes below the lugs 12 and thereby holds the wheel in its said lowermost and operative position. The lugs 6 being in engagement with the cylinder 4, the post 1 will be now turned as the wheel 3 is turned.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, the combination with a steering post and wheel, the said post having its upper end bored out and two elongated lugs mounted in diametric opposition longitudinally upon the surface of the bore at the upper portion thereof and two other elongated lugs mounted in diametric opposition longitudinally upon the said surface in the lower portion of the said bore and longitudinally spaced from the two upper lugs, of a lock cylinder enlarged at its upper end and extended from the said wheel down into the said bore of the post, the said enlarged portion of the cylinder having longitudinal slots adapted to register with and slidably engage the said upper lugs, a lock rod slidably journaled down through the said wheel and cylinder and carrying at its lower end a disk having slots adapted to register with and slidably engage the said lower set of lugs, a dial plate upon the hub of the wheel and through which the lock rod is passed, and an operating knob at the upper end of the said lock rod.

2. In a device of the kind described, the combination with a steering post having a longitudinal bore in its upper end, of upper and lower sets of lock lugs mounted upon the surface of said bore, the said sets of lugs being spaced longitudinally apart, a lock cylinder having an enlarged head slotted to slidably engage the said upper set of lugs, a lock rod slidably journaled longitudinally through the said cylinder, an operating knob at the upper end of the said rod and a lock disk at the lower end thereof, the said disk being slotted to slidably engage the said lower set of lugs.

In testimony whereof I affix my signature.

JOHN H. SCHEER.